US006483833B1

(12) United States Patent
Jagannath et al.

(10) Patent No.: US 6,483,833 B1
(45) Date of Patent: *Nov. 19, 2002

(54) METHOD FOR TRANSMITTING LABEL SWITCHING CONTROL INFORMATION USING THE OPEN SHORTEST PATH FIRST OPAQUE LINK STATE ADVERTISEMENT OPTION PROTOCOL

(75) Inventors: Shantigram Jagannath, Cambridge, MA (US); Jim Luciani, Groton, MA (US); Naganand Doraswamy, Woburn, MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,590

(22) Filed: Jun. 19, 1998

(51) Int. Cl.[7] .............................................. H04L 12/56
(52) U.S. Cl. ....................... 370/392; 709/238; 370/400
(58) Field of Search ................................ 370/397, 392, 370/389, 399, 230, 238, 390, 400, 432; 709/238, 240, 242

(56) References Cited

U.S. PATENT DOCUMENTS

| 5,825,772 A | * 10/1998 | Dobbin et al. ................ 37/396 |
| 5,991,300 A | * 11/1999 | Tappan ....................... 370/392 |
| 6,055,561 A | * 4/2000 | Feldman ....................... 709/200 |
| 6,069,889 A | * 5/2000 | Feldman ....................... 370/351 |
| 6,130,889 A | * 10/2000 | Feldman ....................... 370/397 |
| 6,160,651 A | * 12/2000 | Chang ......................... 359/124 |

OTHER PUBLICATIONS

Rekhter et al., "Tag Switching Architecture," Internet Draft, Jul. 1997, http://www.cabletron.com/support/interne...afts/draft–rekhter–tagswitch–arch–01.txt; 21 pages.

Coltun, Rob, "The OSPF Opaque LSA Option," Internet Draft, Feb. 1998, http://www.cabletron.com/support/interne...net–Drafts/draft–ietf–ospf–opaque–04.txt, 13 pages.

Moy, J., "OSPF Version 2," Request for Comments: 1583; http://info.internet.isi.edu/in–notes/rfc/files/rfc1583.txt, 170 pages.

"Namespaces in XML," World Wide Web Consortium Working Draft Sep. 16, 1998, http://www.w3.org/TR/WD–xml–names, printed Nov. 16, 1998, 9 pages.

* cited by examiner

*Primary Examiner*—Alpus H. Hsu
*Assistant Examiner*—Roberta Stevens
(74) *Attorney, Agent, or Firm*—Blakely Sokoloff Taylor & Zafman LLP

(57) ABSTRACT

A method for distributing label binding information, e.g., a binding between a label and a network layer route, in a label switching environment using the Open Shortest Path First (OSPF) Opaque Link State Advertisement (LSA) option protocol. The binding information is included in an application specific field following the LSA header. LS type 9 LSA packets are used to limit the flooding scope to the local network segments attached to the label switch. Address prefix information, i.e., network address and subnet mask, are transmitted and associated with a label in the application specific field of the Opaque LSA packet. The Opaque LSA packets are exchanged between a group of interconnected Opaque LSA capable label switches so that the label switches can maintain their label forwarding tables and routing tables as necessary to forward data packets according to a label swapping forwarding paradigm.

16 Claims, 2 Drawing Sheets

METHOD FOR TRANSMITTING LABEL SWITCHING CONTROL INFORMATION USING THE OPEN SHORTEST PATH FIRST OPAQUE LINK STATE ADVERTISEMENT OPTION PROTOCOL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to data communications. In particular, the present invention is related to a method for distributing a label binding between a label and a Network layer route for label switching using the Open Shortest Path First (OSPF) Opaque Link State Advertisement (LSA) option protocol.

2. Description of the Related Art

The Transport Control Protocol/Internet Protocol (TCP/IP) suite of protocols is used in many of today's internet-networks (internets). A TCP/IP-based internet provides a data packet switching system for communication between nodes (e.g., end-user workstations, servers, network devices, etc.) connected to the internet. With reference to FIG. 1, Network layer devices known as routers or switches select a path and forward, i.e., route, IP datagrams between nodes connected to the internet. For example, internet 100 includes multiple separate physical networks 160–185 interconnected by switches A, B, C, D, and E at 105, 110, 115, 120, and 125, respectively. The switches route IP datagrams, for example, between nodes 190 and 195, via the multiple physical networks in the internet.

In traditional destination address based routing, a source node, e.g., node 195, transmitting an IP datagram to a destination node, e.g., node 190, specifies as a destination IP address the IP address of the destination node (10.7.1.1) in the IP datagram. The IP datagram is encapsulated in a physical frame and sent to the switch attached to the same physical network as the source node, e.g., switch B or D. The switch, in turn, extracts the IP datagram, and determines the destination IP address. The switch selects the next hop switch enroute to the destination node and again encapsulates the datagram in a physical frame for transmission to the next hop switch. This process continues until the IP datagram reaches the network to which the destination node is connected, wherein the datagram is delivered to the destination node.

Routing tables on each switch store information about what networks are reachable, either directly or via adjacent switches. When a switch receives an IP datagram, it compares the network portion of the IP destination address in the datagram, referred to herein as the address prefix, with the network reachability information stored in its routing table. If a match is found, the switch sends the datagram over the appropriate, directly attached network to the next hop switch through which the destination network is reachable, or directly to the node, if the destination network is directly attached to the switch.

In the event of topological changes to network 100, network reachability information may be maintained up to date automatically in network 100, through the use of an interior gateway protocol (IGP), such as the well known Open Shortest Path First (OSPF) Version 2 TCP/IP internet routing protocol, the specification of which is set forth in the Internet Standard Request For Comments (RFC) 1583, March, 1994. In addition to exchanging network reachability information between switches, OSPF routes IP datagrams over one of possibly multiple routes based on the destination IP address and IP Type of Service specified in the IP header of the datagrams. Further details of the well known OSPF version 2 routing protocol may be found in RFC 1583.

Growth of the Internet, as well as private internets, has placed demands not only on bandwidth requirements, but also the internet routing protocols. Traditional destination address based routing using OSPF version 2 generally allows traffic to be routed based only on destination IP address and IP type of service. New approaches to routing have been sought to improve routing functionality and control as changes in internet traffic patterns and volume emerge.

A relatively recent routing protocol has been proposed known as label switching or tag switching, which combines a label-swapping forwarding paradigm with Network layer routing to provide flexible unicast or multicast routing control for a wide range of traffic patterns and forwarding granularities. For example, label switching provides for routing based on such criteria as destination IP address, a group of destinations, or a single application flow. Essentially, a label, or tag, is associated with selected data packets and routing decisions are made by a switch based on the label associated with the packets. In label switching, a switch (known as and referred to herein as a label switch) compares labels contained in the data packets it receives from an attached network with label forwarding information maintained in the memory of the label switch to perform packet forwarding.

The label forwarding information is maintained by exchanging control information, that is, label forwarding information, among a group of interconnected label switches in an internet. When a packet containing a label is received at a label switch, the label is used by the switch as an index into a data structure, referred to herein as a forwarding table, containing the label forwarding information. The switch compares the received label with the entries in the forwarding table. Each entry contains an incoming label against which the received label is compared, and one or more outgoing labels that are swapped with the received label if a match occurs. Additionally, each entry maintains appropriate interface and link layer information necessary to properly forward the data packet out an interface of the label switch. If the label switch finds an entry in the forwarding table with the incoming label equal to the received label, then the switch swaps the receiving label with an outgoing label, updates the link layer information in the data packet, and forwards the data packet out an appropriate interface, for each of the one or more outgoing labels in the entry.

Label switching involves the binding of labels and Network layer routing information, e.g., binding a label to a route, a group of routes, or an application flow. A label switching control protocol, separate from the forwarding protocol briefly described above, generates the label bindings by allocating a label and binding the label to the routing information. The label switching protocol then distributes the label binding information between the interconnected group of label switches in the internet. The binding information may be distributed among the interconnected group of label switches utilizing an existing routing protocol or a label distribution protocol provided specifically for distribution of the label binding information.

Label switches support, among other things, destination address based routing, in which data packets are forwarded by the label switch based on the destination address in the data packet and the contents of a routing table maintained by the label switch. A label switch allocates and binds the labels to destination address prefixes in the routing table. For each route in the routing table, the label switch allocates a label and generates an entry in the label forwarding table for the allocated label. The allocation and binding of the label, as well as the distribution of the binding information, may be the responsibility of a downstream label switch, i.e., the switch at the receiving end of a network segment with respect to the direction of a transmitted data packet, or an upstream label switch. Additionally, the distribution of binding information may occur as updates or upon request of an adjacent or neighboring label switch. A label switch also receives label binding information for a next hop route from an adjacent label switch and places it in the forwarding table.

It is contemplated that such binding information is advertised using a label distribution protocol or an existing routing protocol. However, there is presently no preferred method of advertising the binding information to a group of interconnected label switches. What is needed is an efficient, transparent method of distributing such information using an existing, widely used protocol.

BRIEF SUMMARY OF THE INVENTION

A method is described for distributing label binding information, e.g., a binding between a label and a network layer route, in a label switching environment using the Open Shortest Path First (OSPF) Opaque Link State Advertisement (LSA) option protocol. The binding information is included in an application specific field following the LSA header. LS type 9 LSA packets are used to limit the flooding scope to the local network segments attached to the label switch. Address prefix information, i.e., network address and subnet mask, are transmitted and associated with a label in the application specific field of the Opaque LSA packet. The Opaque LSA packets are exchanged between a group of interconnected Opaque LSA capable label switches so that the label switches can maintain their label forwarding tables and routing tables as necessary to forward data packets according to a label swapping forwarding paradigm.

BRIEF SUMMARY OF THE SEVERAL VIEWS OF THE DRAWINGS

The present invention is illustrated by way of example and not limitation in the following figures, in which.

DETAILED DESCRIPTION OF THE INVENTION

Described is a method for distributing label binding information, e.g., a binding between a label and a Network layer route, in a label switching environment using the Open Shortest Path First (OSPF) Opaque Link State Advertisement (LSA) option protocol. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in a switch as a software routine, hardware circuit, firmware, or a combination thereof.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Label switching switches data packets according to labels inserted in data packets, commonly either between the Data Link and Network layer protocol header, or as part of the Network layer protocol header, in the data packets. The labels are commonly bound, i.e., associated with, Network layer routing information, e.g., routes. An interconnected group of routers or switches participating in label switching maintain label binding information in a forwarding table, and exchange the same with adjacent switches. The present invention is concerned with the particular method for exchanging, or advertising the label binding information between adjacent switches. While the description that follows specifically addresses the method as it applies to destination address based routing using downstream label allocation, it is appreciated by those of ordinary skill in the art that the method is generally applicable to distribution of binding information for label switching and, furthermore, not limited to any particular label allocation procedure.

Figure 1:
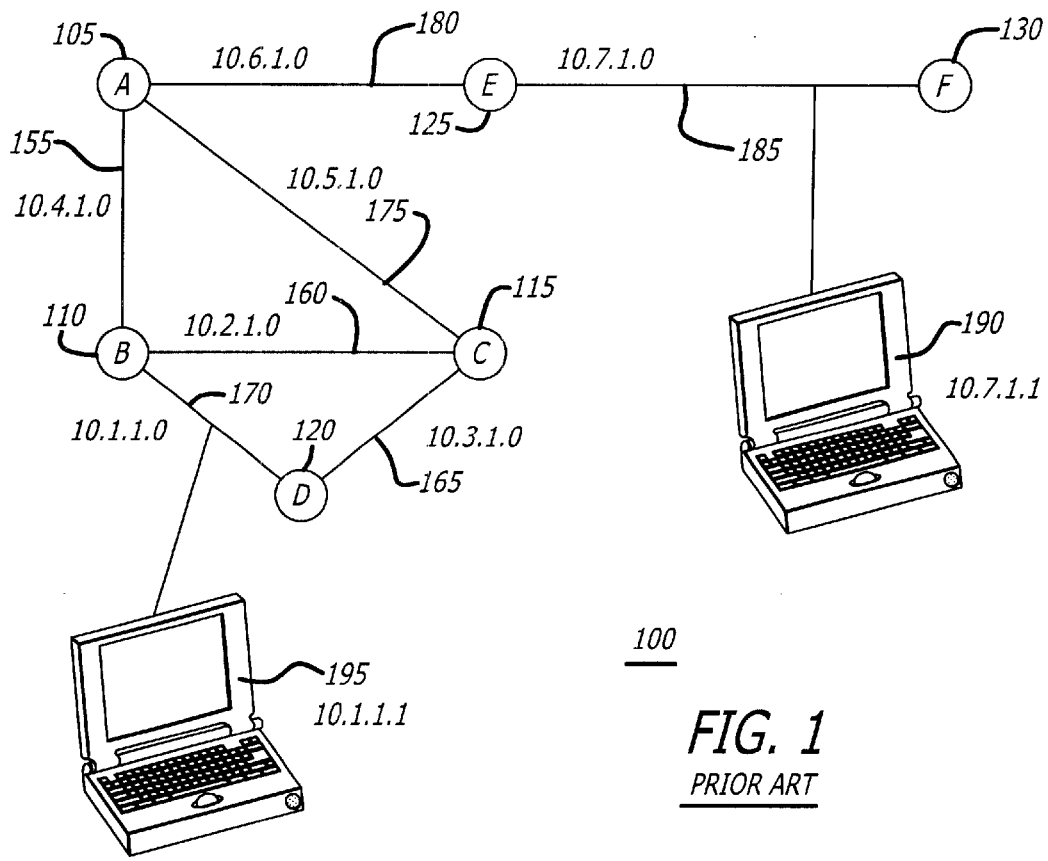
FIG. 1 is a diagram of a data communications internetwork.

With reference to FIG. 1, a switch B, at 110, allocates labels and binds the labels to address prefixes in a data structure in the memory of switch B, referred to herein as a routing table. For purposes of illustrating a method of carrying out the invention, downstream label allocation is described. However, the invention is equally applicable to upstream label allocation. Using downstream label allocation, the switch that allocates a particular label and binds it to one or more address prefixes in a routing table is the downstream switch with respect to the direction of data packets carrying the label. Thus, switch B allocates and binds the label that is used in data packets it receives. Switch B allocates a label and creates an entry in its label forwarding table in which the incoming label is set to the allocated label, for each route in its routing table, thereby binding each label to a route. The contents of the label forwarding table are then distributed to adjacent label switches A, C and D at 105, 115 and 120, respectively.

Switch B also receives label bindings from switches A, C and D for data packets it transmits. In particular, switch B receives label binding information for routes reachable by adjacent, or next hop switches, and places the label extracted from the binding information into the outgoing label field of the entry in the label forwarding table associated with the route. Switch B also updates its routing table with the binding information, as appropriate. In this manner, a label switch, such as switch B, forwards data packets for routes bound to labels according to a label swapping forwarding algorithm. It should be noted that while the discussion thus far primarily addresses an interior routing environment, the steps described are applicable to an exterior routing environment as well, by distributing the binding information to border switches in a routing domain as well as physically adjacent switches using, for example, the Border Gateway Protocol (BGP).

Figure 2:
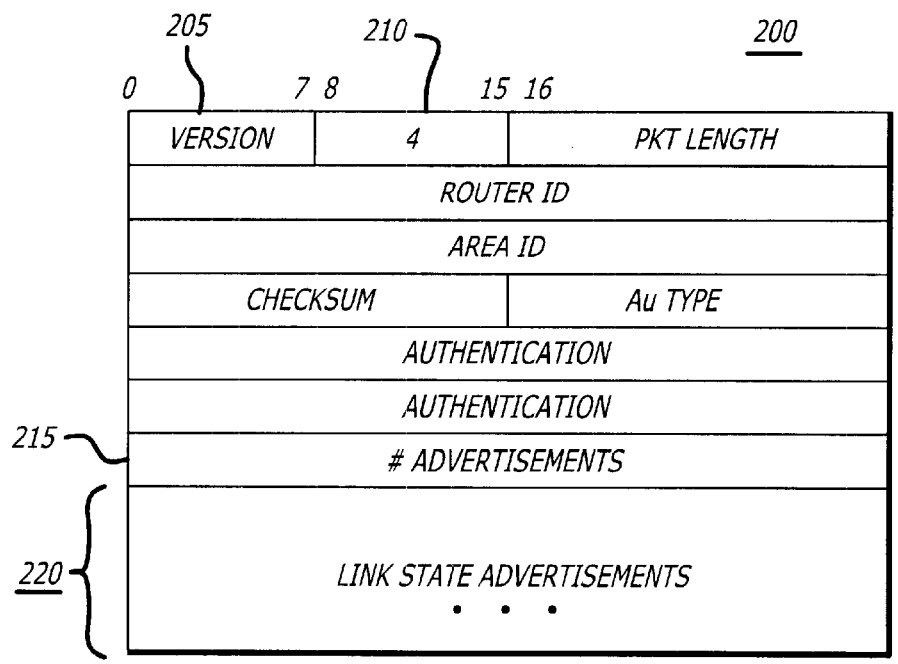
FIG. 2 illustrates the format of an OSPF type 4 packet.

The present invention distributes binding information in the above described manner using the Open Shortest Path First (OSPF) Opaque Link State Advertisement (LSA) optional protocol. With reference to FIG. 2, the format for an OSPF Link State Advertisement (LSA) packet 200 is illustrated. Link state advertisement packets are multicast or broadcast on physical network segments to flood the link state advertisements to the next hop switch in the routing domain. Following the OSPF version field 205 is the OSPF packet type field 210, set to 4. Each LSA packet may contain a number of link state advertisements, as indicated in the "# Advertisements" field 215, with the actual link state advertisements 220 following field 215 in the packet.

Figure 3:
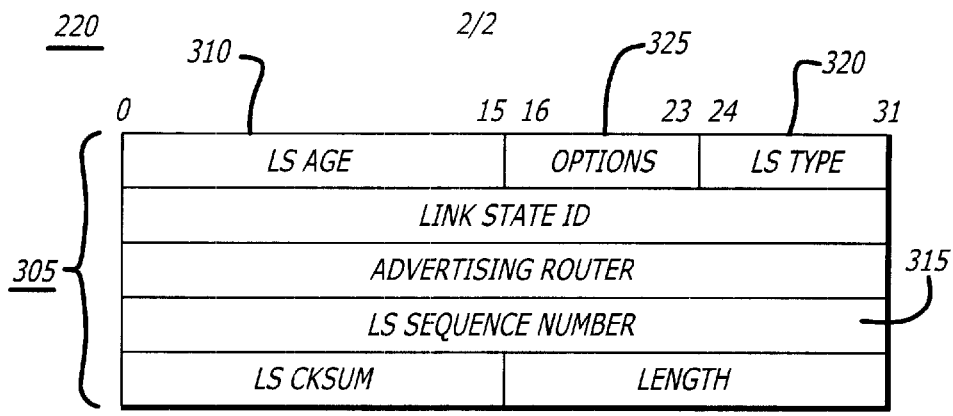
FIG. 3 illustrates the link state advertisement header within an OSPF type 4 packet.
Figure 4:
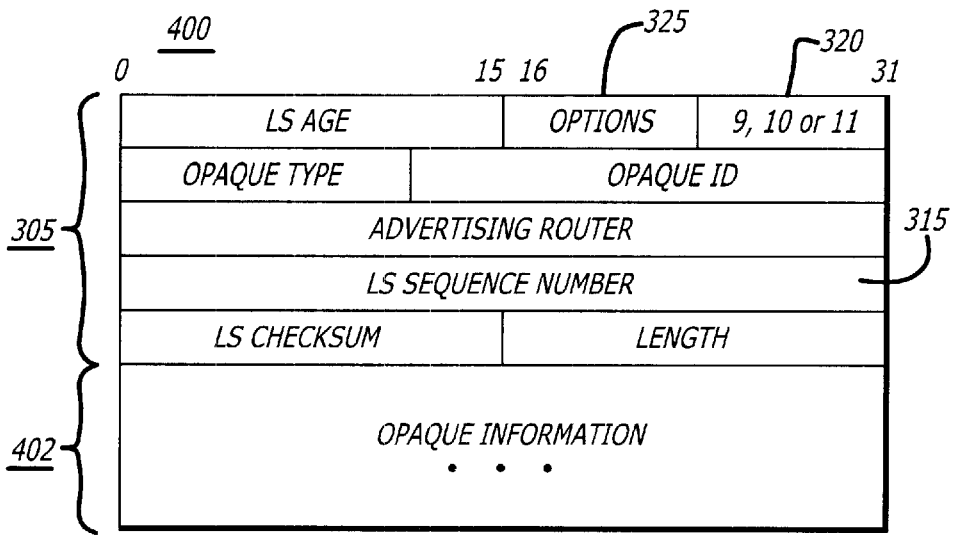
FIG. 4 illustrates the Opaque LSA option for an OSPF type 4 packet.

As shown in FIG. 3, each link state advertisement 220 begins with a 20 byte link state advertisement header 305 that uniquely identifies the link state advertisement. The most recent of potentially multiple copies of the same link state advertisement are distinguished by the link state age (LS age) field 310 and link state sequence number (LS sequence number) field 315. As indicated by the LS type field 320, there are multiple types of link state advertisement packets. The contents of LS type field govern the format of the body of the link state advertisement packet that follows the header 305. For example, LS types 9, 10 or 11 indicate the Opaque LSA option packet type, the format of which is illustrated in FIG. 4.

Figure 5:
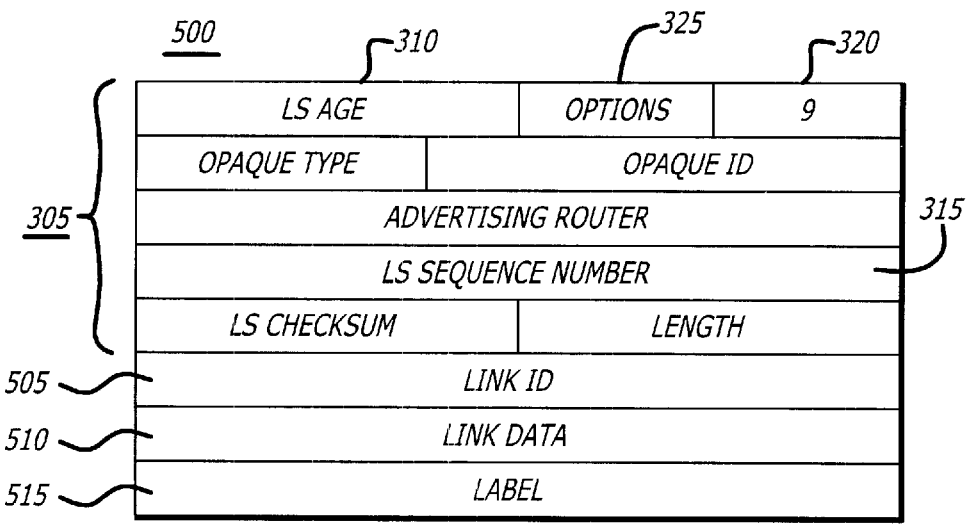
FIG. 5 illustrates an Opaque LSA packet format as may be utilized in an embodiment of the present invention.

Opaque LSAs 400 begin with the standard link state advertisement header 305, followed by a 32-bit aligned information field 402 that contains application specific information which may be utilized by OSPF or other applications. Opaque LSAs are flooded throughout the internet in the same manner as other LSAs according to the well-known link-state database distribution mechanism used by OSPF. The contents of the LS type field 320 define the range of distribution, or flooding scope, for Opaque LSAs: type 9 Opaque LSAs are flooded throughout the local network or subnetwork (scope "link-local"); type 10 Opaque LSAs are flooded throughout an interior routing area defined by the OSPF routing protocol (scope "area-local"); and type 11 Opaque LSAs are flooded throughout an autonomous system. As seen in FIG. 5, an embodiment of the present invention uses type 9 Opaque LSAs to exchange label binding information between adjacent Opaque LSA capable label switches attached to the same local (sub)networks. (An Opaque capable label switch determines whether an adjacent label switch is Opaque-capable through receipt of an OSPF Database Description packet, sent during the Database Exchange Process, in which the O-bit (Opaque bit) in the options field 325 is set.)

FIG. 5 illustrates the format of an Opaque LSA packet 500 as embodied by the present invention. The Opaque LSA packet 500 begins with the standard link state advertisement header 305, followed by label switching binding information contained in Link ID field 505, Link Data field 510 and Label field 515. The Opaque LSA type 9 packets are flooded throughout the link-local, i.e., attached network segments, in the same manner as other LSAs according to the OSPF protocol.

An example follows for exchanging binding information using the OSPF Opaque LSA option protocol. With reference to FIG. 1, switch B, at 110, allocates and binds labels to address prefixes in its routing table. For example, switch B allocates and binds the label X to address prefix 10.1.1.0, the network address for network 170. Additionally, the subnet mask, e.g., 255.255.255.0, associated with the network address for network 170 is also bound to label X. As will be seen, any label switch sending data to network 10.1.1.0 via label switch B will swap the label of a data packet it receives from an upstream label switch to the value X and transmit the data packet to switch B. Switch B allocates label X and creates an entry in its label forwarding table in which the incoming label field in the entry is set to the value X. Switch B performs the same steps to bind unique labels to attached networks 155 and 160. The contents of the label forwarding table are then distributed to adjacent label switches. For example, label binding information for the label X is distributed to switches A and C at 105 and 115, respectively, using OSPF Opaque LSA packets, wherein the LS type field is set to 9, the Link ID field 505 is set to the network address 10.1.1.0, the Link Data field is set to the subnet mask 255.255.255.0, and the Label field 515 is set to X. (Label binding information for the label X is not sent to switch D, since the switch is directly attached to the network with which the label is bound and thus can reach the network in zero hops.)

Switches A and C decode the binding information received from switch B and check their respective routing tables for network 10.1.1.0 and subnet mask 255.255.255.0. If the switches have entries indicating the network is reachable via switch B, they add the label X extracted from the binding information into the outgoing label field of the entry in their respective forwarding tables associated with the route. Switch C, for example, may transmit data to network 10.1.1.0 via switch D rather than switch B, in which case, switch C would not accept the OSPF Opaque LSA from switch B nor create an entry in its label forwarding table binding switch B to the route. Alternatively, switch C could accept the OSPF Opaque LSA from switch B and store it for later use in the event of a network topology change. Switch A, on the other hand, assuming it accepts the Opaque LSA packet and creates appropriate entries in its routing and label forwarding tables, thereafter attaches label X to any data packet it transmits to network 10.1.1.0 via switch B.

Switch A, in turn, transmits an OSPF Opaque LSA packet of type 9 to upstream label switch E (at 125) with a label, e.g., label Y in Label field 515, network address 10.1.1.0 in Link Data field 505, and subnet mask 255.255.255.0 in Link Data field 510, and the process continues in the same manner as described above. Switch E inserts label Y to data packets it transmits to network 10.1.1.0 via downstream switch A.

Switch B also receives label bindings from switches A, C and D for data packets it transmits to networks reachable via those switches. In particular, switch B receives label binding information for routes reachable by switches A C and D, and places the label extracted from the binding information into the outgoing label field of the entry in its label forwarding table associated with the route. Switch B also updates its routing table with the binding information, as appropriate. In this manner, switch B forwards data packets for routes bound to labels according to a label swapping forwarding algorithm described above.

What is claimed is:

1. A method for a label switch to distribute label switching control information to interconnected label switches in a data network, comprising:

creating a label binding;

inserting the label binding into an Open Shortest Path First (OSPF) Opaque Link State Advertisement (LSA) packet, the inserting the label binding into a OSPF Opaque LSA packet comprises transmitting and associating address prefix information with a label in an application specific field of the OSPF Opaque LSA packet; and distributing the OSPF Opaque LSA packet to the interconnected label switches, the distributing the OSPF Opaque LSA packet comprises:

limiting a flooding to local network segments attached to the label switch; and exchanging the OSPF Opaque LISA packet between a group of interconnected Opaque LSA capable switches to maintain label forwarding tables and routing tables of the interconnected label switches to forward data packets according to a label swapping forwarding paradigm.

2. The method of claim 1 wherein creating a label binding comprises:

allocating the label; and binding network reachability information to the label.

3. The method of claim 1, wherein creating a label binding comprises:

allocating the label; and binding an address prefix to the label.

4. The method of claim 1, wherein creating a label binding comprises:

allocating the label; and binding an application flow to the label.

5. The method of claim 1, wherein inserting the label binding information into an application specific field of the OSPF Opaque LSA packet, comprises:

inserting the address prefix into a first field of the application specific field; and inserting the label into a second field of the application specific field.

6. A method for a label switch to distribute label switching control information to interconnected label switches in a data network, comprising:

creating a label binding;

inserting the label binding into an Open Shortest Path First (OSPF) Opaque Link State Advertisement (LSA) packet, the inserting the label binding into an OSPF Opaque LSA packet comprises transmitting and associating address prefix information with a label in an application specific field of the OSPF Opaque LSA packet; and distributing the OSPF Opaque LSA packet to the interconnected label switches to maintain label forwarding tables and routing tables of the interconnected label switches to forward data packets according to a label swapping forwarding paradigm;

wherein distributing the OSPF Opaque LSA packet to the interconnected label switches, comprises:

setting the flooding scope for the OSPF Opaque LSA packet to local network segments; and advertising the OSPF Opaque LSA packet to the interconnected label switches within the flooding scope.

7. A method for distributing label switching control information from a first switch in a data network to a second switch in the data network, comprising:

inserting a plurality of fields including a label binding switching control information into an application specific field of an Open Shortest Path First (OSPF) Opaque Link State Advertisement (LSA) packet, the inserting a plurality of fields comprises transmitting and associating address prefix information with a label in an application specific field of the OSPF Opaque LSA packet;

transmitting the packet from the first switch to the second switch; and at the second switch, employing the label binding switching control information from the packet to update any existing label binding switching control information;

wherein inserting the label binding switching control information into the application specific field of the OSPE Opaque LsA packet comprises:

inserting a Link ID field into a first field of the application specific field.

8. The method of claim 7, wherein inserting the label binding switching control information into the application specific field of the OSPF Opaque LSA packet, further comprises:

inserting a Link Data field into a second field of the application specific field.

9. The method of claim 7, wherein inserting the label binding switching control information into the application specific field of the OSPF Opaque LSA packet, further comprises:

inserting a Label field into a third field of the application specific field.

10. The method of claim 7 being distributed through a switching systems product.

11. The method of claim 7 being distributed through a transmission systems product.

12. The method of claim 7, further comprising:

binding network reachability information to the label binding switching control information.

13. The method of claim 7, further comprising:

binding an address prefix to the label binding switching control information.

14. The method of claim 7, further comprising:

binding an application flow to the label binding switching control information.

15. The method of claim 7, further comprising:

inserting an address prefix into a first field of the application specific field; and inserting the label binding switching control information into a second field of the application specific field.

16. The method of claim 7, further comprising:

setting a flooding scope for the OSPF Opaque LSA packet to local network segments; and advertising the OSPF Opaque LSA packet to the first switch and the second switch within the flooding scope.

* * * * *

UNITED STATES PATENT AND TRADEMARK OFFICE
CERTIFICATE OF CORRECTION

PATENT NO.    : 6,483,833 B1
DATED         : November 19, 2002
INVENTOR(S)   : Jagannath et al.

It is certified that error appears in the above-identified patent and that said Letters Patent is hereby corrected as shown below:

<u>Column 7,</u>
Line 21, please delete "LISA" and insert -- LSA --.

<u>Column 8,</u>
Line 25, please delete "OSPE Opaque LsA packet" and insert
-- OSPF Opaque LSA packet --.

Signed and Sealed this

Twenty-ninth Day of July, 2003

JAMES E. ROGAN
*Director of the United States Patent and Trademark Office*